PROGRAMMING PINBOARD

Filed Aug. 31, 1962

United States Patent Office 3,246,208
Patented Apr. 12, 1966

3,246,208

PROGRAMMING PINBOARD

Rowland G. Lex, Jr., Ambler, Raymond W. Ross, Cheltenham, and William T. Wynne, Willow Grove, Pa., assignors to Leeds and Northrup Company, Philadelphia, Pa., a corporation of Pennsylvania Filed Aug. 31, 1962, Ser. No. 220,610
6 Claims. (Cl. 317—101)

This invention relates to programming pinboards and pins or plugs used with such boards and has for an object the provision of novel pins and board structures which function as a decimal digit indicator and provide a parallel binary-coded-decimal output signal.

Pinboards and pins have been used for electrical circuit selection for many years. In recent years with the advent of data handling systems, such as data loggers and computers, pinboard programming has become increasingly important for such functions as selection of range, scale linearization, selection of alarm limits, selection of input channels to be integrated, selection of zero offsets and other similar functions. It has been customary to employ crisscrossed bus structures as input and output circuits in the form of pinboards for the temporary storage of such data. The pins used with such boards have been plain unmarked pins of the solid conductor type and also of the type employing a diode to effect connection of a desired input circuit (horizontal buses) with a desired output circuit (vertical buses), the diode being employed to prevent conflicting back circuits sometimes referred to as "sneak" circuits. It is to be understood that the input and output functions of the buses may be interchanged.

The purpose of programming in data handling systems is to provide a means for semi-permanent storage of data so that it will be available for use in the proper section of the system when called for by a channel selector. For such functions as range, alarm level, etc., it is desired to store a numerical value which is introduced into the proper unit or section of the system when a predetermined channel is connected thereto. In order to store a digital value, it has been customary heretofore to use a plurality of vertical buses in groups of ten to store a single decimal digit by placing an unmarked diode pin or plug switch in one of a group of ten horizontally aligned holes overlying the cross points of the horizontal bus and the related vertical buses to energize a selected one of the vertical buses of the group. The ten buses frequently were connected with an encoder which converted the decimal digit to binary-coded-decimal output for use in a computer or a comparator or the like. Such practice required many vertical buses when numbers having several digits were involved thus requiring substantial pinboard area. The numerical value of the stored digital data was indicated only by the location or locations of the one or more blank pins used and thus was very difficult for an operator to read. While pinboards of this prior type have been extensively used in data handling and computer systems, nevertheless they have left something to be desired in the way of conservation of space since they required considerable pinboard area and also in regard to ease of reading the pinboard data since it was difficult to determine a number from the location of widely separated blank pins.

Applicants have discovered that the separate encoder for decimal to binary-coded-decimal conversion can be eliminated and that digital indicating pins or plugs of the type embodying the present invention may be used with pinboards of conventional design or digital indicating pins and pinboards of the novel design disclosed herein may be used together directly to provide parallel binary-coded-decimal outputs. The pins and pinboard structures of the present invention, as herein described, are of relatively simple construction thus permitting ease of manufacture at low cost and in addition conserve a substantial amount of panel area over that previously required. The novel pin construction also provides clear visual indication of the digital value of the stored data by use of a numerical display as contrasted to determination of the number by noting the positions of spaced blank pins as in prior devices. A single unitized assembly of this invention provides digital indication of stored data and parallel binary-coded-decimal output.

In accordance with one aspect of the present invention, there is provided a coded plug for developing a binary-coded-decimal output signal, the plug having a plurality of contact areas. As required, one or more areas will have means associated therewith for effecting a circuit closure by said area. The plug is further provided with indicia on an exposed portion thereof indicative of the coded value stored in the circuits in accordance with which, if any, of the plug areas have been rendered effective to close a circuit. In a preferred form of the invention, the contact areas of the plug are provided by a plurality of metal spring contact structures which project from the body of the plug. As required, one or more diodes or rectifier means are connected in circuit between contact structures of the plug to establish the coded circuit in accordance with the indicia on the plug.

In accordance with another aspect of the invention, there is provided a programming pinboard having a plurality of input strips and a plurality of multi-circuit output strips arranged in crisscross array. The input strips each have a continuous conductive path throughout the length thereof and each one of the output strips has a plurality of conductive paths throughout the length thereof cooperating with the input strips. The strips at their crossing points provide a plurality of aligned contact areas for the programming board with the contact areas being respectively connected to the conductive paths through rectifier means.

Further, in accordance with another aspect of the invention, there is provided a programming pinboard having input strip and output strip structures arranged in crisscross array. Each input strip structure is provided with a continuous conductive path throughout the length thereof and each of the output strip structures includes a plurality of conductive paths throughout the length thereof. Coded plug structures are provided for the pinboard, the plug structures each having a plurality of areas employed for developing a binary-coded-decimal output signal from the pinboard. The plug structures are each further provided with an indication of the coded output as established by connections internally of the plug.

For a more detailed understanding of the invention and for further objects and advantages thereof reference is to be had to the following description taken in conjunction with the accompanying drawings in which.

Figure 1:
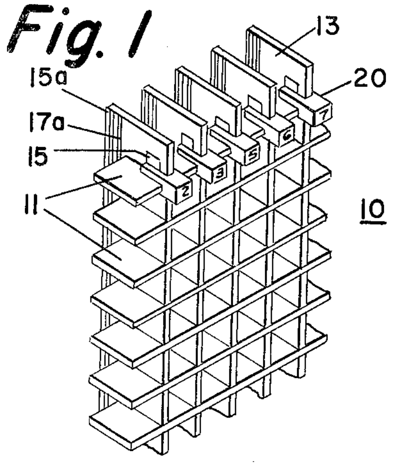
FIG. 1 is a perspective view of a pin and programming pinboard assembly embodying the present invention.
Figure 2:
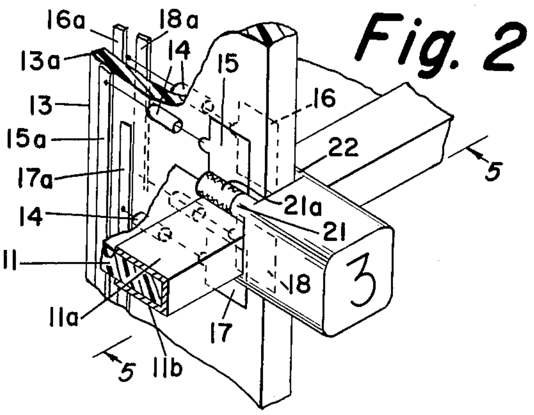
FIG. 2 is a fractional assembly view of the parts illustrated in FIG. 1.

Referring to the drawings, there is shown in FIG. 1 a pinboard 10 embodying the present invention. The pinboard 10 includes a plurality of input strips 11 and output strips 13 arranged in crisscross array. The input strips 11, as shown in FIG. 2, include a central insulating member having conductive portions 11*a* and 11*b* extending along one edge thereof in the form of a bus bar. The conductive portions 11*a* and 11*b* are illustrated as forming opposite legs of an elongated U-shaped section of thin flat metal sheet or other similar material which has been attached to the insulating portion of member 11 by suitable means such as cement. It is also to be understood that the conductive portions 11*a* and 11*b* may be produced by printed circuit techniques or any other technique which provides a good electrically conductive surface so as to form a bus bar. The bus bar may also be made from solid metal, if desired. The output strips 13 which form the vertical bus structure in FIGS. 1, 2, 3, and 5 comprise a central body member 13*a* of insulating material, such as fibre board or equivalent. The insulating member 13*a* is provided on its surface with a plurality of conductive paths arranged so that circuits may be establishesd through one or more paths as desired. Both of the bus structures 11 and 13 are notched along one of their edges for interengagement when arranged in a crisscross manner, as shown in FIGS. 1–3.

Figures 3, 4, 5, 6:
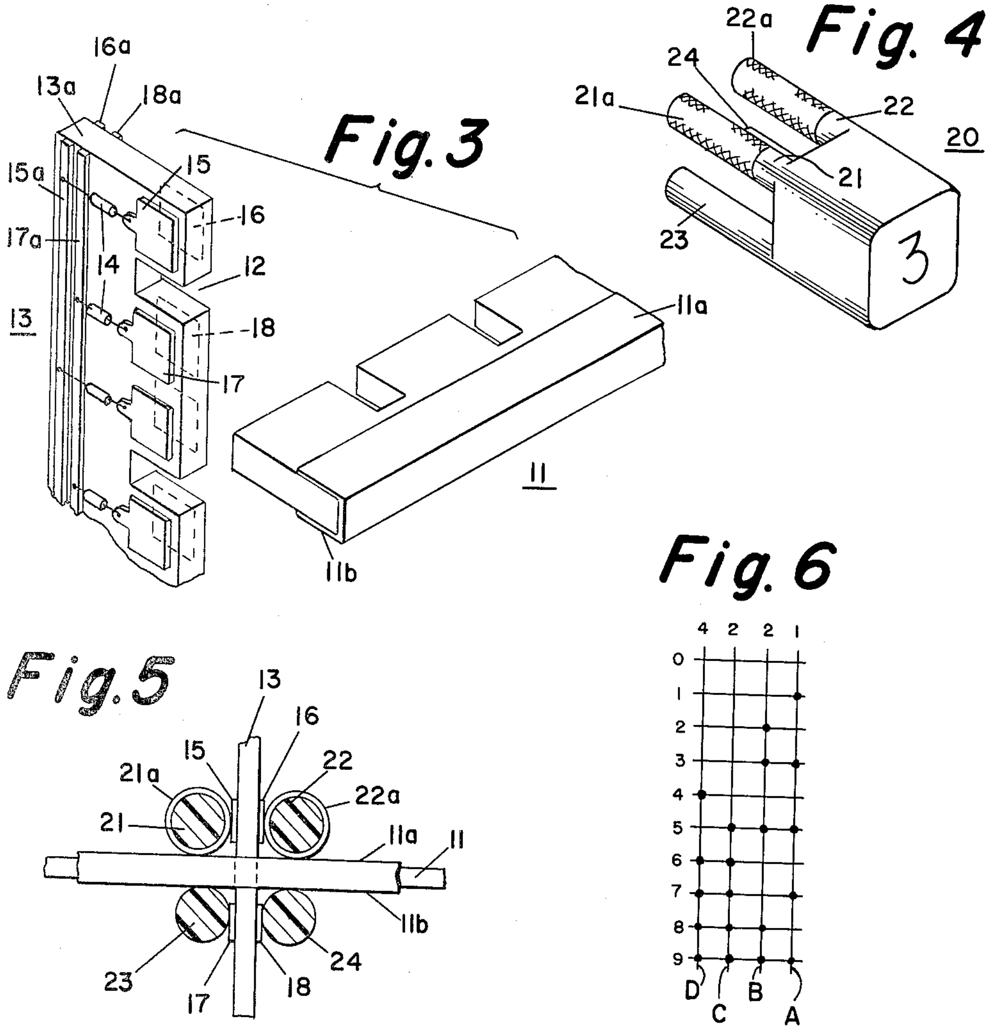
FIG. 3 is an exploded fractional view in perspective of the programming board shown in FIG. 1.
FIG. 4 is a perspective view of a coded pin or plug adapted for use with the pinboard of FIG. 1 and embodying the present invention.
FIG. 5 is a cross sectional view as indicated by the line 5—5 of FIG. 2.
FIG. 6 is a schematic diagram of a binary code of the 4–2–2–1 type useful in describing applicants' invention.

Referring to FIG. 3, it will be seen that adjacent the first notch or slot 12 in output strip 13, there are provided four conductive areas 15–18. These areas 15–18 may comprise thin metal plates or other material having good electrically conductive properties firmly attached to the sides of the output strip 13 in the positions indicated. The conductive areas 15–18 may also be produced by well-known printed circuit techniques. It will be noted that extending lengthwise of the output strip 13, FIGS. 2–3, there are four elongated conductive paths 15*a*–18*a*. These conductive paths 15*a*–18*a* extend continuously from one end of the output strip 13 to the other. The conductive paths 15*a*–18*a* may be produced in the same manner as the conductive areas 15–18. The conductive paths 15*a* and 17*a* are positioned on one side of the output strip 13, while the conductive paths 16*a* and 18*a* are positioned on the opposite side of strip 13. The conductive areas 15–18 are connected to their respective elongated conductive paths or longitudinal buses 15*a*–18*a* by way of diodes 14. Each of the slots or notches in the output strips 13 is provided with associated conductive areas 15–18 similar to those described in association with slot 12.

Referring to FIG. 4, there is shown one embodiment of a novel pin or plug structure 20. The plug 20, as shown, includes a body portion of insulating material having at one end thereof four prongs 21–24 extending axially of the plug. The other end of the body portion of the plug is provided with indicia the purpose of which will hereinafter be described. In the plug 20 shown in FIG. 4, two of the prongs 21 and 22 have been provided with conductive coatings or metal sleeves forming surfaces 21*a* and 22*a* respectively. The other prongs 23 and 24 have not been coated but instead consist of insulating material the same as the body portion of the plug. The insulating material may be of any well-known resilient material, such as wood, plastic, dense rubber and the like which is sufficiently resilient to provide a slight spring effect on the prongs. When the plug 20 is inserted in the pinboard 10, as shown in FIGS. 1 and 2, the prongs or pins will spread apart as necessary and the pins 21 and 22 will engage contact portions 15 and 16 respectively on the opposite sides of the output strip 13 and the prongs 23 and 24 will engage contact areas 17 and 18 respectively on opposite sides of strip 13. Likewise, prongs 21 and 22 will engage the conductive portion 11*a* of input strip 11 while prongs 23 and 24 engage the conductive portion 11*b* of the input strip as is most clearly shown in FIG. 5. As is evident the metal contact areas 21*a* and 22*a* establish electrical connections between bus 11*a* and buses 15*a* and 16*a* respectively while no circuits are established with the buses 17*a* and 18*a*.

While the plug 20 in FIG. 2 has been illustrated as having conductive coatings on only two of the prongs, it is to be understood that different plugs will have different coating arrangements from none to all four prongs being coated as hereinafter described. By selectively coating the prongs of several plugs 20, selection of numbers for parallel binary-coded-decimal output is simplified. The plugs 20 of FIG. 4, as used in pinboard 10, shown in FIG. 1 may be such that none or all of the prongs have a conductive coating. Whether or not a prong has a conductive coating depends upon whether it is desired to make an electrical connection between the input strip and one of the four output buses.

To further explain the operation of the plugs or pins and the pinboard, reference may be had to the schematic diagram shown in FIG. 6. In FIG. 6, a code is illustrated of the 4–2–2–1 parallel binary type. There are four vertical lines A–D which correspond to the four buses 15*a*, 16*a*, 17*a*, and 18*a* respectively. The horizontal lines in FIG. 6 each represent the same input bus 11 and the numbers 0 to 9 indicate the binary-coded-decimal output obtained when electrical connections are made between the input and output buses as indicated by the dots which represent coated areas on the prongs of a plug 20 of FIG. 4. To produce a 0 plug, it will be seen from FIG. 6 that none of the prongs should have a conductive coating. To produce a numeral 1, it will be seen that the prong 21 should have a conductive coating 21*a*, while the other prongs 22–24 should be uncoated. To produce a numeral 2, it will be seen that the prong 22 should have a conductive coating 22*a*, while the other prongs 21, 23 and 24 are uncoated. The numeral 3 is produced by having conductive coatings on prongs 21 and 22. Looking at FIGS. 4 and 5, it will be seen that prongs 21 and 22 are provided respectively with conductive coatings or metallic sleeves 21*a* and 22*a*. The prongs 23 and 24 are uncoated. It is for this reason that the plug 20 in FIG. 4 is provided at its end with the numeral 3.

Referring to FIG. 6, it will again be seen that if none of the prongs 21–24 of a plug 20 are coated with electrically conductive material and such a plug is positioned at any intersection of the bus bar structures of FIG. 1, the output will be 0 from the vertical buses when the horizontal input bus is energized. If a plug 20 on which only pin 21 is coated is placed at any intersection of the vertical and horizontal bus bars then an input on that horizontal bus bar will be converted to a parallel binary-coded-decimal output of the numeral 1. If only pin 22 were coated, then the input would be converted to a coded output of the numeral 2. Such a plug is shown as the first plug on the left of the upper row in FIG. 1. A number 3 plug has coatings on prongs 21 and 22, as illustrated in FIGS. 2, 3, and 5. This plug establishes a connection with the pinboard to convert the input to a parallel binary-coded-decimal output of 3. From the foregoing description and illustration, it will be seen that by using a plurality of single bus input and multi-bus output strips the code conversion is accomplished by placing any of ten different numbered coded plugs at the proper intersection of the pinboard to obtain a multiple digit number in parallel binary-coded-decimal output as illustrated in FIG. 1. For a five digit number, such as 23,567, five plugs are required and five multi-bus output strips. The plugs corresponding to numerals 2 and 3 are provided with coatings on the respective pins in the manner previously described. The plug for numeral 5 is produced by having coatings on prongs 21, 22 and 23. The plug for the numeral 6 is provided with coatings on prongs 23 and 24, and the plug for the last digit numeral 7 has coatings on its prongs 21, 23 and 24. It will be apparent that a plug for the number 8 will have coatings on prongs 22, 23 and 24 and that for a plug for the numeral 9 all of the prongs will be coated.

Thus, by utilizing the novel plug and pinboard construction of the present invention, the digital display of the input function will be such that the digits are positioned side by side in the normal manner in which they would be read by an operator. This convenient arrangement is best seen in FIG. 1 where the input function is indicated for the input strip 11. The outputs are in parallel binary-coded-decimal and are derived from the upper ends of the vertical strip 13.

Figures 7, 8, 9, 10:
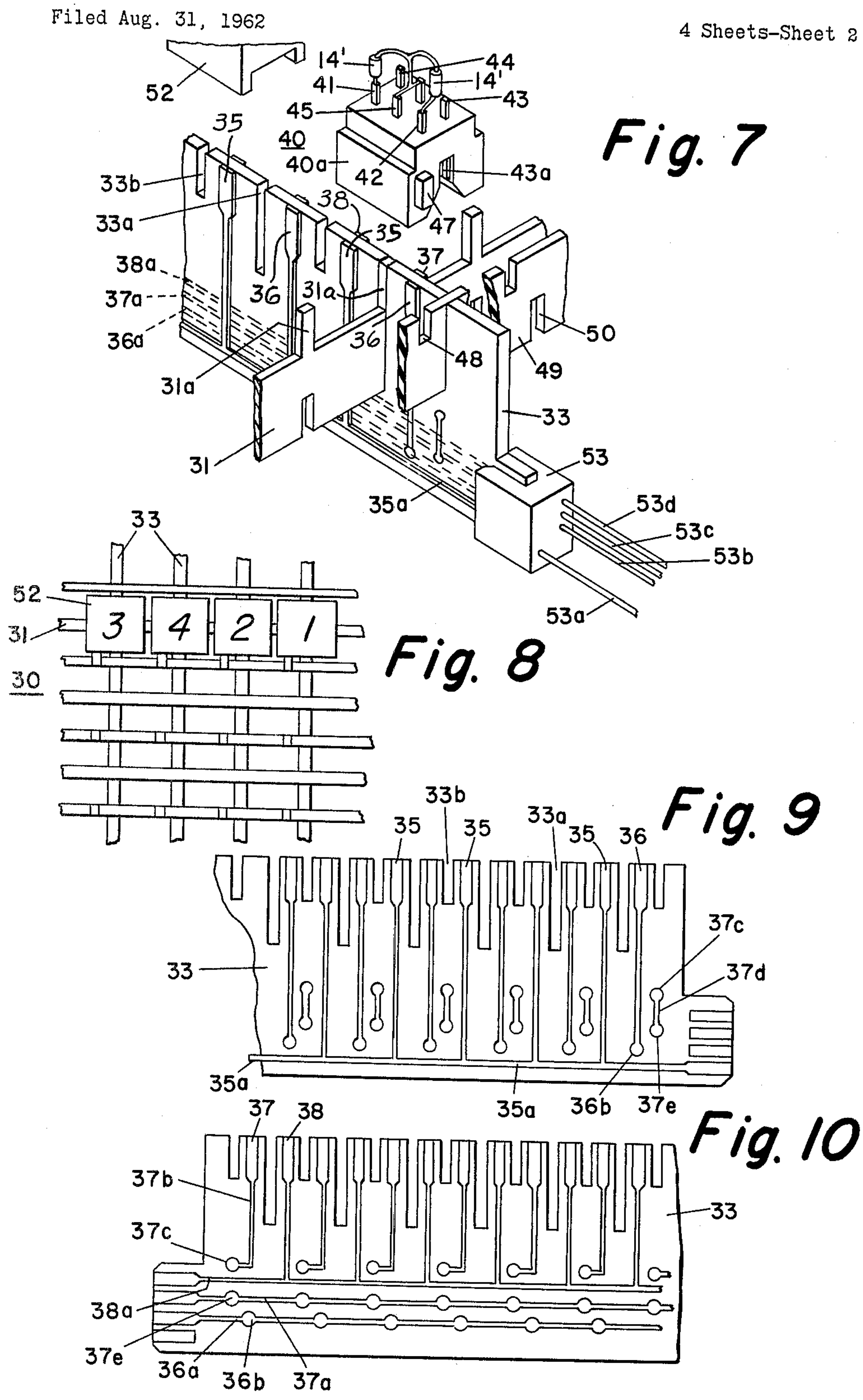
FIG. 7 is an exploded fractional view in perspective of a modification of the invention.
FIG. 8 is a fractional plan view of a pinboard and plug assembly of the type shown in FIG. 7.
FIGS. 9 and 10 are fractional views of the opposite sides of the output strip structure shown in FIGS. 7 and 8.

Another form of the invention is illustrated by the modification shown in FIGS. 7–10. In this modification, the diodes are included in the plug assembly rather than in the programming pinboard and are used to establish the coded connections achieved in the modification of FIGS. 1–5 by the coatings on the prongs. As may be seen in FIG. 8, the programming pinboard 30 comprises a plurality of input strips 31 and output strips 33 arranged in crisscross array similar to the programming pinboard 10 shown in FIG. 1. In programming pinboard 30, the input strips 31 have been illustrated as of solid material, such, for example, as brass. The input strips 31, FIG. 7, are provided with notches spaced along one edge thereof and with tongues 31*a* disposed along the other edge at corresponding spaced locations. The tongues 31*a* are adapted to be engaged by contacts of a plug 40 as hereinafter described. The output strips 33 are illustrated as printed circuit boards of insulating material having notches extending along one edge thereof. The deep notches 33*a* are adapted to receive the corresponding notches of the input strips 31. The tongues 31*a* of the input strips 31 have a width equal to the thickness of the printed circuit output strips 33. To insure proper alignment, when forming the "egg crate" or crisscross construction, the tongues 31*a* and associated slots are on common centerlines thereby placing the tongues on the input strips 31 in the exact position required to fill the engaged notches in the output strips 33. This is clearly shown in FIG. 7. Adjacent the sides of the notches 33*a* which receive the tongues 31*a* are electrical contacts formed by conductive areas 35–38. Conductive areas 35 and 36 are disposed on one side, the near side, of the printed circuit board 33, while conductive areas 37 and 38 are on the opposite side. The conductive area 35 is connected directly to a conductive path or electrical bus 35*a* which extends the entire length of each output strip 33, FIG. 9. The contact areas 36–38 are respectively connected to three additional buses 36*a*–38*a* disposed on the opposite side of the output strip 33, FIG. 10. Since bus 36*a* is disposed on the opposite side of the input strip 33 from its contact 36, the connection is made through the insulating material of output strip 33 at 36*b*, FIGS. 9 and 10. The contacts or conductive areas 38 are connected directly to the buses 38*a* on the same side of the output strip 33, as shown in FIG. 10. The contacts 37 are connected to their respective buses 37*a* by way of a conductive path 37*b* which extends through the insulating strip at 37*c* over a conductive path 37*d* to connect with the bus 37*a* by way of a through connection 37*e*, FIG. 10.

From the foregoing description and from FIG. 7, it will be seen that the conductive or contact areas 35–38 are disposed in pairs and on opposite sides of each slot 33*a* which receives an input strip, an arrangement similar to that shown in the embodiment of FIG. 3. The contact areas 35–38 are adapted to cooperate with corresponding contacts of a plug assembly 40. As may be seen in FIG. 7, the plug 40 comprises a U-shaped channel member 40*a* of insulating material having disposed therein six spring contacts arranged in three pairs. The contacts 41, 42, 43 and 44 correspond respectively to contacts 21–24 on plug 20 in the modification shown in FIGS. 1–5. The pair of contacts 45 are connected together as shown in FIG. 7 and provide a connection through the plug 40 with the input strip 31. The lower ends of the contacts 41–45 are provided with spring members, only one of which, 43*a*, has been shown in FIG. 7. The spring members of contacts 41–44 are each adapted to engage the four contact areas 35–38 on the output strip and the spring members of contacts 45 engage the opposite sides of tongue 31*a* of the input strip 31 when plug 40 is assembled with the programming pinboard in the manner shown in FIG. 8. To insure that the plug 40 will be inserted in the programming pinboard 30 in the correct manner, the plug is provided with a key 47 which is adapted to be inserted in a corresponding slot 48 in an insulating strip 49. The strip 49 is provided with spaced notches or slots 50 along the lower edge thereof, FIG. 7, which are adapted to be received in the short notches or slots 33*b* in output strip 33.

The four buses 35*a*–38*a* on the output strips 33 correspond to the four buses 15*a*–18*a* on the output strips shown in FIGS. 1–5. Thus, the buses 35*a*–38*a* have the same relation to the 4–2–2–1 binary code illustrated in FIG. 6. Accordingly, when an electrical path is established from the input strip 31 through contacts 45 to contact 41 by connecting a diode 14′ between contact 41 and contacts 45 and through contact 41 to conductive area 35 and bus 35*a* a parallel binary-coded-decimal output for the numeral 1 is provided from buses 35*a*–38*a*. When an electrical connection is completed by the insertion of a diode between contact 45 and contact 42 the pin or plug 40 will have been coded and a binary-coded-decimal output for a numeral 2 is provided when the plug is inserted in the pinboard, and when an electrical connection is completed between the contacts 45 and 44 a plug for a numeral 4 is provided. Depending upon the combinations of connections made by the insertion of diodes 14′ between contacts 45 and various ones of the contacts 41–44 will depend the binary-coded-decimal output which the plug will produce as diagrammatically illustrated by FIG. 6.

For example, in FIG. 7, the plug 40 which includes a diode connection between contacts 45 and 41 and 45 and 42 has been coded for converting an input to a parallel binary-coded-decimal output for the digit 3. Thus, it will be seen that the output lines or buses of the pinboard are energized in a manner to produce a parallel binary-coded-decimal output which corresponds to the digital value as determined by the diode configuration of the plug 40. The body portion 40*a* of the plug 40 is provided with a cap or cover 52 on which a displayed the digital value of the binary-coded-decimal output which will be produced by the plug. As shown in FIG. 7, the binary-coded-decimal output for the plug illustrated is for the numeral 3.

The output buses 35*a*–38*a* on the output strips 33 extend to the end thereof and are adapted for connection with a conventional printed circuit plug connector 53, FIG. 7, including spring contacts similar to those of plug 40. The plug 53 includes four pairs of spring contacts with output terminals 53*a*–53*d* connected respectively to the active contact of each pair which in turn are connected respectively to output buses 35*a*–38*a*.

As pointed out above, the plug 40 includes the diode connections whereas the embodiment shown in FIGS. 1–4 has the diodes mounted on the output strips. The modification shown in FIGS. 7–10 is preferred in that only the number of diodes necessary to provide the particular parallel binary-coded-decimal output are used. For example, only two diodes are required for the binary-coded-decimal 3 in the modification shown in FIGS. 7–10, whereas four diodes are employed for each plug-in connection point in the embodiment shown in FIGS. 1–5. There is an additional advantage in the modification shown in FIGS. 7–10.

If there is a diode failure in the plug 40, the offending plug can be easily removed and replaced with a properly operating plug. The defective plug can be repaired at leisure or discarded. In both of the modifications above described, spring failure is curable by simply replacing the plug.

While the schematic diagram in FIG. 6 illustrates only ten variations in plug connections to produce the digits 0 to 9, it will be apparent that digits 2–7 can be produced by different combinations of the 4–2–2–1 code illustrated. Thus, there are possible sixteen different plug combinations, i.e., sixteen different contact character combinations, which may be used to produce stored data. As will also be understood by those skilled in the art different four-bit codes may be used and likewise the invention lends itself to the use of other multi-bit codes.

Figure 11:
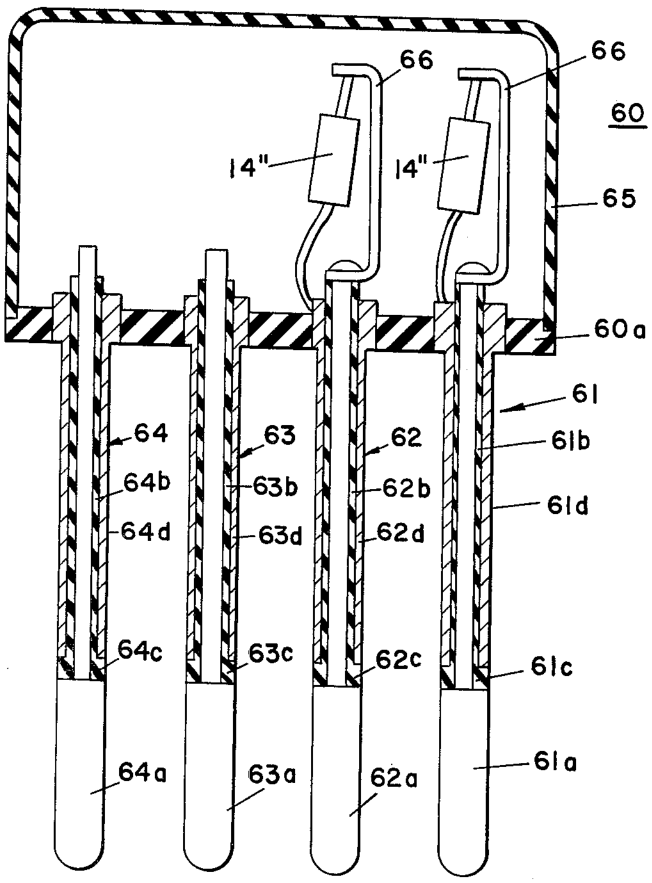
FIG. 11 is a vertical sectional view of another modification of the plug structure embodying the present invention.
Figure 12:
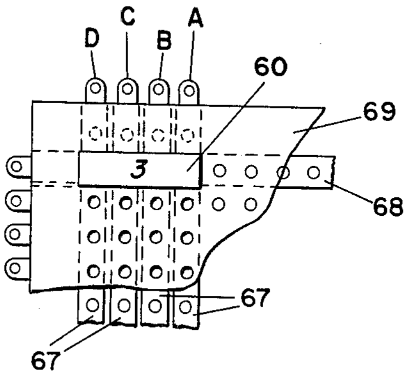
FIG. 12 is a plan view of the plug of FIG. 11 associated with a pinboard.

Referring to FIGS. 11 and 12, there is shown a further modification of the invention. In FIG. 11, there is shown a plug 60, having four prongs 61–64 arranged in a single row. The prongs extend from the lower side of an insulating body 60*a*. Each of the prongs 61–64 comprises a contact member 61*a*–64*a* having an upper end of reduced diameter which extends into a cap 65. The portions of members 61*a*–64*a* of reduced diameter have positioned on each of them a tubular sleeve of insulating material 61*b*–64*b*. The lower end of each of these insulating tubes is provided with a shoulder 61*c*–64*c*, which supports an outer conductive metal tube 61*d*–64*d*. The tubes 61*d*–64*d* extend into the cap 65 and each together with its contact member 61*a*–64*a* provides spaced electrically insulated contact structure on the respective prongs 61–64. The plug 60 may have its contacts connected in any one of sixteen different combinations as indicated by the schematic diagram of FIG. 6. The plug 60 in FIG. 11 has been illustrated as having circuit connections to provide a binary-coded-decimal output 3. The upper ends of the members 61*a* and 62*a* are provided with brackets 66 which in turn are each connected to a diode 14'' and the latter respectively connected to the outer tubular contacts 61*d* and 62*d*. The plug 60 is adapted for use in a conventional pinboard structure of a type using crisscross decks of spring contacts. Each deck of spring contacts comprises a series of parallel spring buses 67 and 68. The buses 68 represent input buses, while the buses 67 in the other deck represent output buses. It will be apparent that when the pin or plug 60 is plugged into pinboard 69 the pins 61–64 of the plug 60 extend into adjacent holes in the pinboard which will bring each of these pins into contact with the input bus 68. The pin 61 will also be in contact with one of the output buses 67 identified by reference character A, pin 62 will be in contact with another of the output buses 67 identified by reference character B, pin 63 will be in contact with another of the output buses 67 identified by reference character C, and pin 64 will contact a fourth output bus 67 identified by the reference character D. These buses correspond to buses A–D in FIG. 6. Since the diodes 14'' in pin 60 establish connections between 61*a* and 61*d* and 62*a* and 62*d*, the pin establishes connections between bus 68 and each of the buses A and B which provides a binary-coded-decimal output 3 since the prongs 63 and 64 do not have any electrical connection between their lower contacts 63*a*, 64*a* and their upper contact 63*d*, 64*d* and thus do not provide an electrical connection between the input buses 68 and the output buses 67 identified by reference characters C and D respectively. Programming pinboards, similar to pinboard 69, are available commercially under the trade name "Sealectro." It will be apparent that electrical connections through diodes 14'' may be omitted or made between all of the segments of prongs 61–64 of plug 60 in any combination depending upon the bindary-coded-decimal output desired. It will be apparent that the advantages of applicant's novel binary-coded plugs may be obtained with the use of existing programming pinboards.

Figures 13, 14, 15:
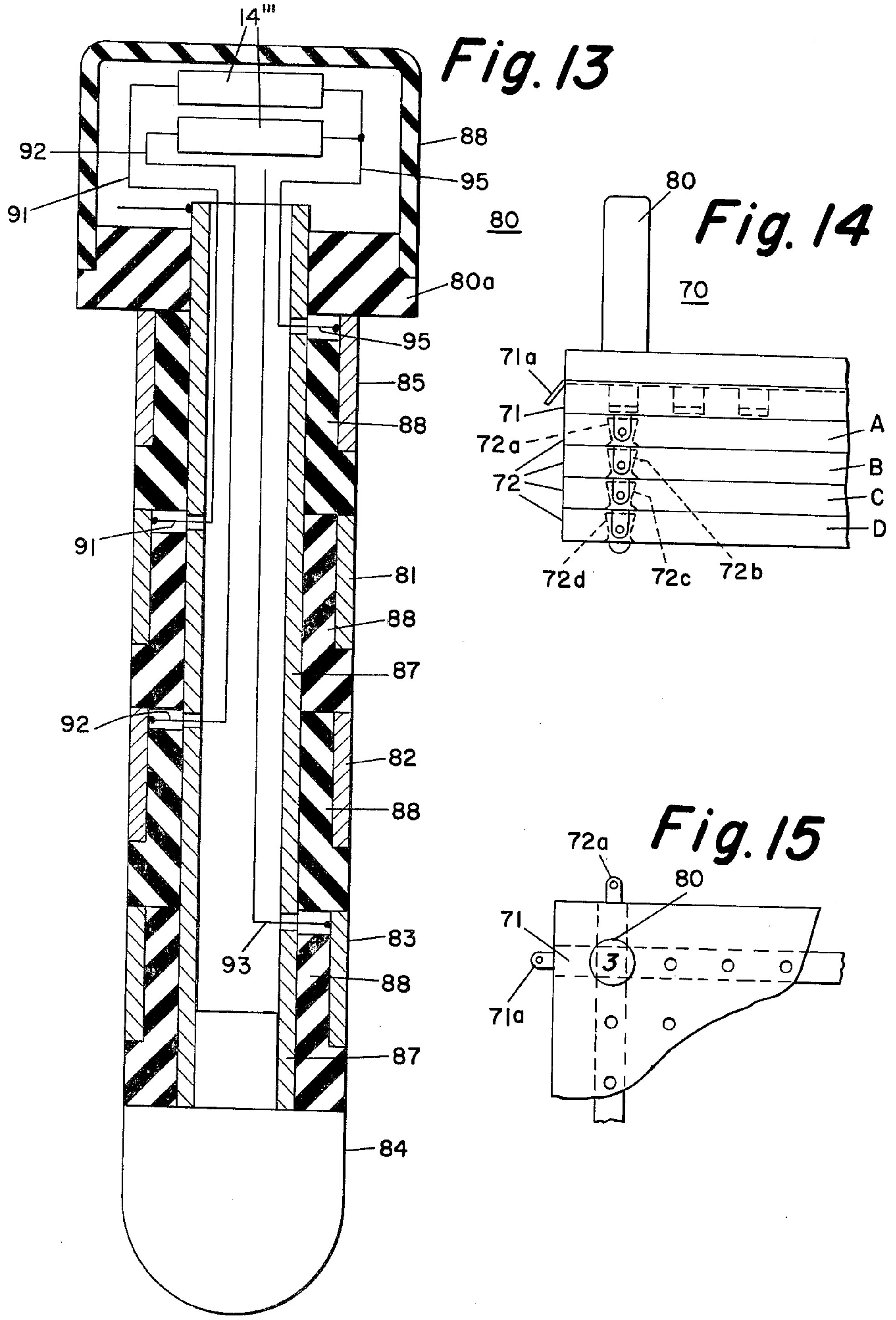
FIG. 13 is a vertical sectional view of a further modification of a plug structure embodying the present invention.
FIG. 14 is a fractional elevational view of the plug of FIG. 13 associated with a pinboard.
FIG. 15 is a plan view of FIG. 14.

With reference to FIGS. 13–15, there is shown a further modification of applicants' invention as applied to a programming pinboard of the commercially available multi-deck or sandwich type. As may be seen in FIG. 14, the pinboard 70 comprises an input deck 71 providing the top contact layer of the sandwich, while the output decks 72 provide the remaining contact layers of the sandwich. Four output strips 72*a*–72*d* have been illustrated and they correspond to the outputs A, B, C and D of FIG. 6. The sandwich layer 71 includes a plurality of parallel contact buses 71*a* which, as shown in FIG. 15, extends in a horizontal direction, only one bus 71*a* having been ilustrated. The output contact buses 72*a*, only one of which is shown, of the sandwich layer 72 extend in a vertical direction, as shown in FIG. 15, there being a total of four layers 72*a*–72*d*, one above the other, as shown in FIG. 14. It will be understood that the input layer 71 will comprise a plurality of parallel input buses 71*a* and that the output layers 72 will each comprise a plurality of parallel output buses 72*a*–72*d*, although in FIGS. 14 and 15 only one set of buses is shown. The other have been omitted for purposes of clarity.

The novel plugs 80 to be used with the programming pinboard 70 have been shown in vertical section in FIG. 13. The plug 80 comprises an insulating member 80*a* from which there depends five contact areas 81–85. The contact areas 81–84 are adapted to make contact with the output buses 72*a*–72*d* in sandwich layers 72 identified by letters A–D respectively. The contact area 85 is adapted to make contact with the input bus 71*a*, FIGS. 14 and 15.

As may be seen in FIG. 13, the lower contact 84 is in the form of a plug inserted in the lower end of a hollow metal tube 87. The upper end of the tube 87 extends through the insulating body 80*a* into the interior of a cap 88. The contacts 81–83 and 85 are formed by metal rings which are separated vertically from each other on the tubular member 87 by means of shouldered insulating sleeves 88. The insulating members 88 act as spacers for the ring contacts 81–83 and 85. The electrical connections from the rings 81–83 and 85 are made by way of conductors 91–83 and 95 respectively. These conductors in the form of electrically insulated wires are connected with one of their ends to the respective sleeves and extend into the tubular member 87 and upwardly through the length thereof into the cap 88. The tubular member 87 forms the electrical conductor for the bottom contact 84. The plug 80 illustrated in FIG. 13 has been connected to provide a binary-coded-decimal output of 3. Thus, the conductors 91 and 92 have been connected by way of diodes 14''' to conductor 95 which is connected to the upper contact ring 85. When the plug 80 is inserted in the programming pinboard 70, FIGS. 14 and 15, the contact ring 85 will engage the input contact bus 71*a*, while contacts 81–84 will respectively engage the output buses 72*a*–72*d* in layers A–D, FIG. 14. Since the bottom contact 84 and the next contact ring 83 are not electrically connected to the input contact ring 85, no circuit closures will be effected by them. Accordingly, only contact rings 81 and 82, which are electrically connected to input ring 85 will effect circuit closures in the binary-coded-decimal output matrix. Since rings 81 and 82 engage the output buses 72*a* and 72*b* respectively in sandwich layers A and B, they will provide the parallel binary-coded-decimal output 3 in accordance with the schematic diagram of FIG. 6.

It will be noted in the drawings that each of the various forms of coded plugs 20, 40, 60 and 80 has its contact engaging structures electrically spaced from each other and disposed parallel to the plug-in axis of the plugs and their respective pinboards.

It shall be understood the invention is not limited to the specific arrangements shown, and that changes and further modifications may be made within the scope of the appended claims.

What is claimed:

1. A programming pinboard comprising an input strip and output structure both having notches along one of their edges for inter-engagement when arranged in crisscross array, said input strip having a continuous conductive path throughout the length thereof, said output structure being of insulating material and having a plurality of conductive paths throughout the length thereof, conductive areas adjacent each of said notches of said output structure, each of said conductive areas at the crisscross being electrically isolated from said conductive path of said input strip and being electrically connected to a corresponding one of said conductive paths of said output structure, a coded plug structure inserted in said pinboard where said input strip and said output structure cross, said plug structure having a plurality of areas engaging said conductive areas of said output structure and also engaging said input strip for developing a binary-coded output signal from said pinboard, and said plug having indicia indicative of said coded output.

2. A programming pinboard according to claim 1 wherein at least one of said plurality of areas on said plug structure includes conductive material.

3. A programming pinboard according to claim 1, wherein said plurality of areas of said plug structure comprise pairs of electrical contacts.

4. A programming pinboard according to claim 1, wherein said plug structure includes rectifier means where required for connecting said continuous conductive path of said input strip and said conductive paths of said output structure through said plug structure.

5. A programming pinboard according to claim 1, wherein said output structure includes rectifier means connected in circuit through said plug structure with said input strip.

6. A programming pinboard comprising a plurality of input strips and a plurality of output strips both having notches along one of their edges for interengagement when arranged in crisscross array, said input strips each having a continuous conductive path throughout the length thereof, said output strips each being of insulating material and having a plurality of separate conductive paths along the length thereof, conductive contact areas adjacent each of said notches of said output strips, each of said conductive contact areas at the crisscross being electrically isolated from said conductive path of said input strip and being electrically connected to a corresponding one of said conductive paths of said output strips, said conductive contact areas cooperating with said conductive path of one of said input strips so that said strips at the crisscross provide a plurality of aligned and electrically spaced contact areas of said programming pinboard.

References Cited by the Examiner

UNITED STATES PATENTS

| | | | |
|---|---|---|---|
| 233,081 | 10/1880 | Dowd | 339—18 |
| 296,253 | 4/1884 | Vail | 339—18 |
| 2,951,184 | 8/1960 | Wyma | 339—17 |
| 2,952,828 | 9/1960 | Dorizzi | 339—18 |
| 3,061,816 | 10/1962 | Reynolds | 317—99 |

KATHLEEN H. CLAFFY, *Primary Examiner.*

JOHN F. BURNS, *Examiner.*